United States Patent
Chen et al.

(10) Patent No.: US 7,482,599 B2
(45) Date of Patent: Jan. 27, 2009

(54) FLUID ULTRAVIOLET STERILIZATION SYSTEM

(75) Inventors: Jian Chen, Fujian (CN); Minyi Han, Fujian (CN)

(73) Assignee: Fujian Newland Entech Co., Ltd., Fujian (CN)

( * ) Notice: Subject to any disclaimer, the term of this patent is extended or adjusted under 35 U.S.C. 154(b) by 247 days.

(21) Appl. No.: 11/600,608

(22) Filed: Nov. 16, 2006

(65) Prior Publication Data

US 2007/0114442 A1     May 24, 2007

(30) Foreign Application Priority Data

Nov. 18, 2005     (CN) .................. 2005 1 0125222

(51) Int. Cl.
*C02F 1/32* (2006.01)
*B01D 19/08* (2006.01)
*G01N 23/12* (2006.01)

(52) U.S. Cl. .............. 250/455.11; 250/504 R; 250/435; 250/436; 250/428; 250/432 R; 210/748; 422/24; 422/43; 422/186.3

(58) Field of Classification Search .......... 250/455.11, 250/504 R, 435, 436, 428, 432; 422/24, 422/43, 186.3; 210/748
See application file for complete search history.

(56) References Cited

U.S. PATENT DOCUMENTS

| | | | |
|---|---|---|---|
| 5,547,590 A * | 8/1996 | Szabo ........................ 210/748 |
| 6,683,313 B2 * | 1/2004 | Chen et al. ............. 250/455.11 |
| 7,026,630 B2 * | 4/2006 | Chen et al. .................. 250/431 |
| 2007/0125959 A1 * | 6/2007 | Chen et al. ............. 250/453.11 |
| 2007/0125960 A1 * | 6/2007 | Chen ..................... 250/455.11 |

* cited by examiner

*Primary Examiner*—Nikita Wells
(74) *Attorney, Agent, or Firm*—Saliwanchik, Lloyd & Saliwanchik

(57) ABSTRACT

The invention provides a fluid UV sterilization system capable of automatically and stably keeping the fluid level, which includes a channel, a UV lamp module group, an electrical controller and a mounting bracket for UV lamp module(s), each UV lamp module comprising a frame and a plurality of UV lamps, the orientation of the frame and the lamps is perpendicular to or forms an angle with the general flow direction in the channel. A baffle is provided on either or both of the upstream and downstream of at least one of the UV lamp module(s), and the bottom of the baffle extends to such an extent towards the bottom of the channel that it at least reaches within the effective radiation distance of the UV lamp module group towards the fluid surface. The fluid UV sterilization system according to the present invention can control the fluid level automatically and stably, and can be used for the sterilization of domestic sewage, industrial sewage, recycled water, tap water and other kinds of water.

15 Claims, 2 Drawing Sheets

FLUID ULTRAVIOLET STERILIZATION SYSTEM

FIELD OF THE INVENTION

The invention relates to fluid ultraviolet (UV) sterilization, and more particularly to a fluid UV sterilization system capable of keeping the fluid level automatically.

DESCRIPTION OF RELATED ART

It is well known that a fluid UV sterilization system requires keeping a certain fluid level so as to ensure the sterilization effect. When the flow rate of the fluid increases such that the fluid level goes beyond the effective radiation distance of the UV sterilization system (said effective radiation distance means the largest distance between a UV light source and viruses or bacteria that can be annihilated or deactivated by the UV light source in the fluid to be sterilized, with the fluid to be sterilized having a certain transmissivity), part of the fluid will be drained away directly without being effectively sterilized, thus impairing the overall sterilization effect. Therefore, it is necessary to control the fluid level or the flow rate of the fluid inflow so that the fluid level will not go beyond the effective radiation distance of UV lamp module(s) towards the fluid surface, while still being not lower than the lowest fluid level limit. Said lowest fluid level limit generally defines the smallest allowable distance between the highheat parts of the UV lamps and the fluid surface, so as to ensure that the highheat parts of the UV lamps would not being exposed to the atmosphere, thereby facilitating the protection of the UV lamps and lengthening their service life as well.

A known technique involves providing at least one overflow gutter on the downstream of the mounting bracket of the UV lamps, near the end of the channel, which is also used as an outlet port of the sterilization system. The main body of the overflow gutter is cuboid-shaped, and the top edge of the gutter is on the same level with the lowest fluid level limit of the system or is slightly lower than the latter. The gutter has openings in one or two of its end portions, which are used as outlet openings communicating with the drainage passage of the sterilization system. When the flow rate increases such that the fluid surface in the channel becomes higher than the top edge of the gutter, the fluid above the top edge will get over said top edge and into the gutter, further flows into the drainage passage of the system via the outlet openings of the gutter, thereby achieving the purpose of keeping the fluid level. In the case where the size and number of said at least one overflow gutter are to be predetermined according to the practical conditions of the system, the larger the flow rate or the variation range of the flow rate is, the more overflow gutters are needed with intervals being provided between adjacent ones, thus the channel has to be lengthened. Such a well-designed overflow gutter arrangement can keep the fluid level reliably without the need of any electrical and accessional devices, thus it is of simple structure and easy for maintenance. Furthermore, it can operate reliably and safely, and consume less energy. However, in the case where the flow rate or the variation range of the flow rate is large, in order to ensure the sterilization effect, it is necessary to provide more overflow gutters for drainage of fluid so that the fluid level would not go beyond the effective radiation distance of the system. Therefore, the channel has to be considerably lengthened and the cost for construction and land has to be increased, and the drainage of fluid is also disadvantageously influenced.

Other techniques involve providing a flap valve or an electrical gate at the end portion of the channel to control the fluid level. Similarly, in this case the highest fluid level in the sterilization area should not go beyond the effective radiation distance of the UV lamp module(s), otherwise, part of the fluid which is beyond the effective radiation distance would flow out of the channel without receiving sufficient UV radiation, thus impairing the overall sterilization effect. Therefore, for such a system adopting any of the above-mentioned three kinds of drainage measures while not using other fluid level control devices at the same time, it is desirable that the highest fluid level should not go beyond the effective radiation distance, which leads to a low difference value of pressure heads between the inlet end and the outlet end of the UV lamp module(s), and a small allowable variation range of the flow rate of the fluid inflow. In this system it is not possible to ensure that all the fluid in the channel would pass through the effective radiation area and receive sufficient UV radiation when the flow rate or the variation range of the flow rate is large. Furthermore, since there are a large number of devices in the system, the cost is increased, and the convenience for assembly and maintenance as well as the operating reliability are impaired.

Therefore, a UV sterilization system with a simple structure and occupying less area is needed, which is adapted to the case where the flow rate varies to cause the fluid level in the channel to go beyond the effective radiation distance, thereby enlarging the allowable variation range of the flow rate of the fluid inflow. Furthermore, said system is convenient for assembly and maintenance, and can control the fluid level automatically and operate reliably, so as to meet the requirement for sewage treatment.

SUMMARY OF THE INVENTION

Therefore, the object of this invention is to provide a fluid UV sterilization system with a simple structure and occupying less area, which allows for a large variation range of flow rate, and can keep the fluid level automatically and operate reliably.

In order to achieve the above object, the invention provides a fluid UV sterilization system including an electrical controller, a channel, a UV lamp module group consisting of one or more UV lamp module(s), each UV lamp module comprising a frame and a plurality of UV lamps mounted on the frame; the channel being provided with a fluid level control device, wherein the orientation of the frame of each UV lamp module is perpendicular to or parallel to or forms an angle with the general flow direction in the channel; a baffle is provided on either the upstream or both the upstream and downstream of at least one of the UV lamp module(s), the top of the baffle is higher than the effective radiation distance of the UV lamp module group towards the fluid surface, and the bottom of the baffle extends to such an extent towards the bottom of the channel that it at least reaches within the effective radiation distance of the UV lamp module group towards the fluid surface, and the projected width of the baffle on the channel section perpendicular to the general flow direction on the upstream of the baffle is equal to the internal width of the channel at a place where the baffle is located. In order to improve the sterilization effect, a baffle can be provided on either or both of the upstream and downstream of each UV lamp module. It is also possible to provide a plurality of baffles outside the UV sterilization area in the channel. Said UV lamps are low voltage or medium voltage UV lamps.

Said baffle can be mounted in the following manners:

1. Said baffle is mounted on the UV lamp module(s), extending from the bottom of the mounting bracket towards the bottom of the channel to such an extent that the bottom of which at least reaches within the effective radiation distance of the UV lamp module group towards the fluid surface;

2. Said baffle is mounted on the bottom of the mounting bracket, extending towards the bottom of the channel to such an extent that the bottom of which at least reaches within the effective radiation distance of the UV lamp module group towards the fluid surface;

3. Said baffle is fixed on the channel.

Said baffle can be a blind plate, or the upper part thereof is blind while the lower part thereof has perforations, said perforations are located within the effective radiation distance of the UV lamp module group towards the fluid surface.

The UV fluid sterilization system according to the present invention has the following advantages:

1. The space above the effective radiation distance of the UV lamp module(s) towards the fluid surface, between the inlet end and the outlet end of the channel, can be used as a buffer zone before the fluid flows out, so that the flow direction of the fluid beyond the UV radiation area is changed and it passes through the effective UV radiation area. Therefore, this system is adapted to the case where the inlet flow rate varies such that the fluid level in the channel goes beyond the effective radiation distance, thus enlarging the allowable variation range of the inlet flow rate of the system.

2. With the aid of the baffle, the fluid beyond the effective radiation distance is diverted to pass through the effective UV radiation area, so as to receive sufficient UV radiation, thereby improving the sterilization effect, operating reliability and safety of the sterilization system.

3. Since there are no overflow gutters in the system, the channel can be shortened, the area occupied by the system can be reduced, and the layout of the sewage treating plant can be simplified, thereby saving the cost for land and system construction.

4. Since there is no electrical fluid level control device in the sterilization system, the equipment investment as well as energy consumption can be reduced.

5. The fluid overflows from the system naturally, which facilitates keeping the fluid level at the outlet end of the channel at a constant height, thereby the reliability, safety and stability of the system can be ensured.

6. The baffle is mounted on the mounting bracket for the UV lamp module(s) or on the frame of the UV lamp module(s) or on the channel, and such a simple structure facilitates the manufacture and assembly of the system, thereby reducing the equipment investment and the cost for manufacture, assembly and maintenance.

7. Since the fluid level at the outlet end of the channel is always kept within the effective radiation distance of the UV lamp module(s) towards the fluid surface and above the high-heat parts of the UV lamps during the operation of the system, the UV lamps can be effectively protected and obtain a long service life.

In the figures, an electrical controller is designated by 1; a sterilization channel is designated by 2; a UV lamp module group is designated by m1; UV lamp module(s) is designated by 3; a frame of the UV lamp module(s) is designated by 301; a mounting bracket for the UV lamp module(s) is designated by 4; mounting slot(s) on the mounting bracket 4 for mounting the UV lamp module(s) is designated by 5; baffle(s) is designated by 6; UV lamp(s) is designated by 7; a light-shielding plate is designated by 8; a fluid level control device is designated by 9; the fluid level at the inlet end of the channel is designated by H1; the height at the bottom of the baffle(s) is designated by H2; the height at the outlet end of the channel is designated by H3.

DETAILED DESCRIPTION OF PREFERRED EMBODIMENT

Figure 1:
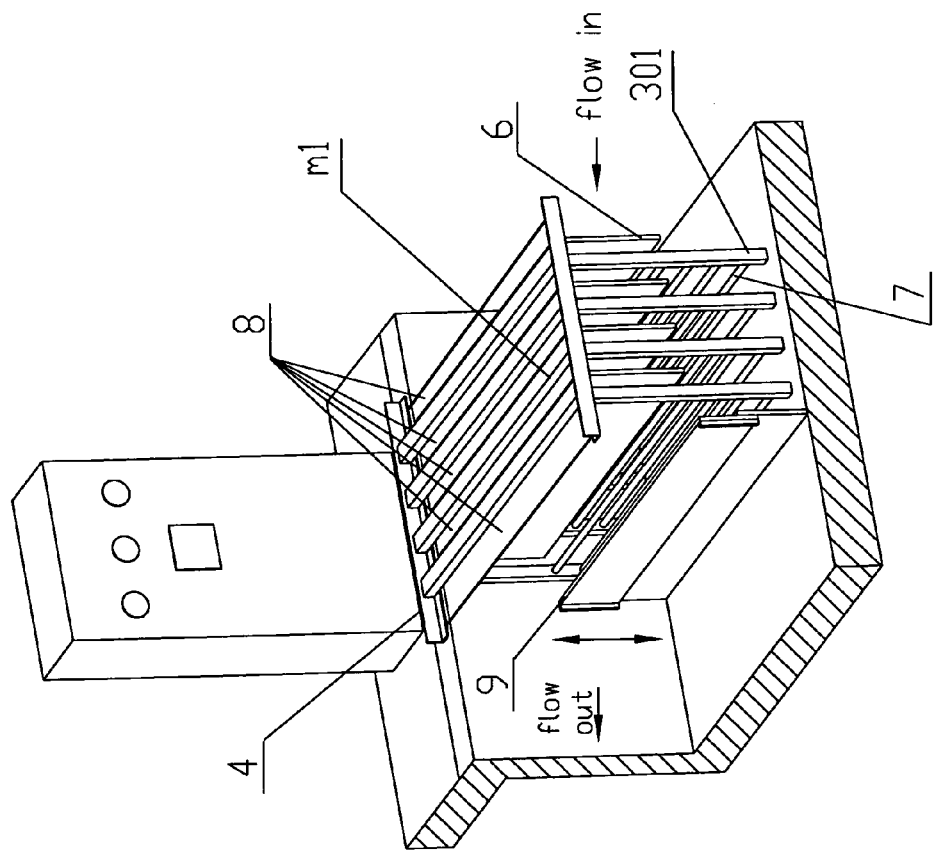
FIG. 1 is a schematic sectional view of first embodiment according to the present invention.
Figure 2:
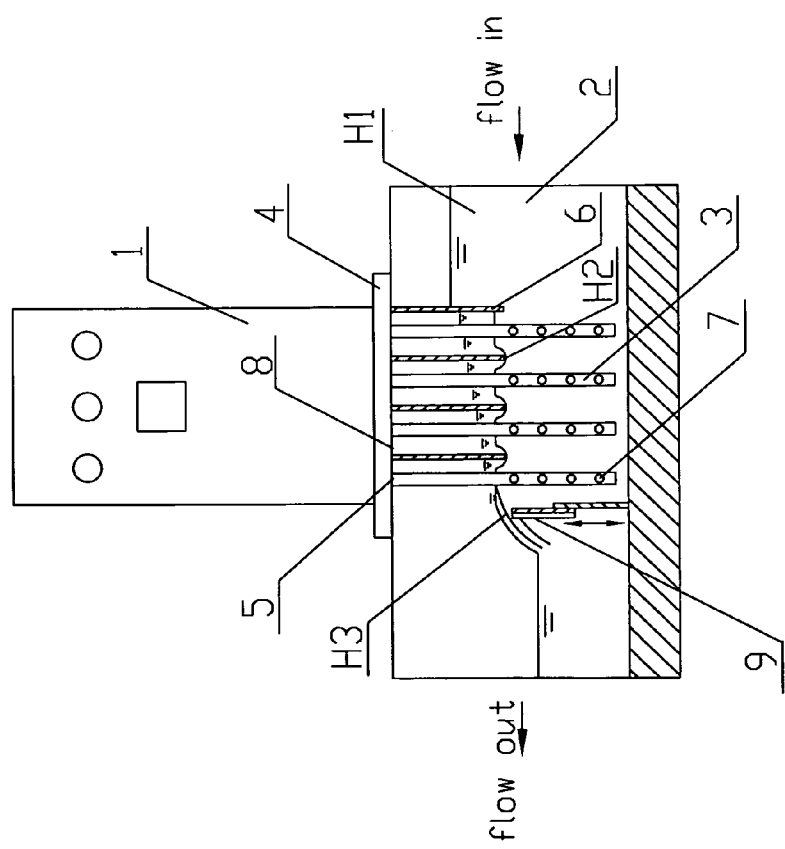
FIG. 2 is a schematic perspective view of the first embodiment according to the present invention.

In the first embodiment of the invention, as shown in FIG. 1 and FIG. 2, the fluid to be sterilized flows into the channel 2 from one end thereof, and the other end of the channel 2 is provided with a fluid level control device 9 for fluid outflow. The fluid UV sterilization system includes one UV lamp module group m1, which consists of a plurality of UV lamp modules 3, and each of the UV lamp modules 3 comprises a frame 301 and a plurality of UV lamps 7 mounted on the frame and arranged parallel to each other. The orientation of the frame of each of the UV lamp modules is perpendicular to the general flow direction in the channel.

The mounting bracket 4 for the UV lamp module group is fixed on the channel. The mounting bracket 4 is provided with exactly the same number of mounting slots 5 as that of the UV lamp modules for the mounting of the latter. A closed light-shielding plate 8 is provided between adjacent mounting slots 5 of the mounting bracket 4 for shielding the UV light from leaking out of the channel 2. The bottom of the light-shielding plate 8 of the mounting bracket 4 is provided with the same number of baffles 6 as that of the UV lamp modules 3. Each baffle 6 is disposed on the upstream of each UV lamp module 3. The projected width of each baffle 6 on the channel section perpendicular to the general flow direction on the upstream of each baffle 6 is equal to the internal width of the channel at a place where each baffle is located, and the thickness of each baffle is equal to or less than the interval between two adjacent modules.

Each baffles 6 extends from the bottom of the mounting bracket 4 towards the bottom of the channel to such an extent that the bottom of each baffle 6 at least reaches within the effective radiation distance of the UV lamp module group towards the fluid surface. The top of the outlet end of the channel is also located within the effective radiation distance of the UV lamp module group towards the fluid surface. Each baffle 6 can be a blind plate, or the upper part thereof is blind while the lower part thereof has perforations, which perforations are located within the effective radiation distance of the UV lamp module group m1 towards the fluid surface. Due to the bafflement of each baffle 6, the fluid above the bottom of each baffle 6 is diverted to pass through the effective UV radiation area below said bottom, so as to receive sufficient UV radiation and achieve a desired sterilization effect. The sterilized fluid overflows naturally from the top of the outlet end of the channel on the downstream of the UV lamp module group m1. It is also possible to dispose a baffle 6 on the downstream of each UV lamp module 3. In this embodiment, each UV lamp module is provided with one baffle.

As shown in FIG. 1, it is assumed that the fluid level at the inlet end of the channel is H1, i.e. the highest fluid level on the upstream of the UV lamp module group m1 is H1. The height at the bottom of each baffle 6 is H2 and the height at the top of the outlet end of the channel is H3. It is possible, through presetting the value of H3, to keep the fluid level at the outlet end of the channel within the effective radiation distance of the UV lamp modules towards the fluid surface, while stilling preventing the highheat parts of the UV lamps from being exposed to the atmosphere, such that the sterilized fluid overflows out naturally. In this embodiment the fluid level control device 9 is used as an overflow weir at the outlet end of the channel, such that the sterilized fluid overflows out naturally.

The bottom of each baffle 6 is within the effective radiation distance of the UV lamp module group m1 towards the fluid surface.

Figure 3:
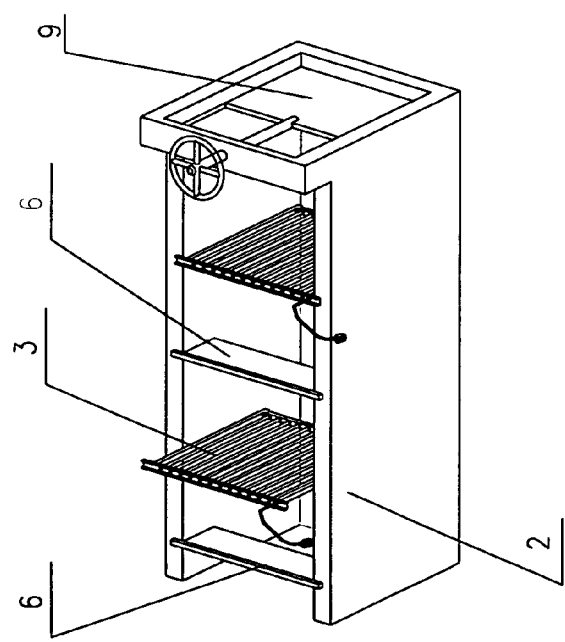
FIG. 3 is a schematic view showing the positional relationship between the UV lamp module(s) and the baffle(s) in second embodiment similar to the first embodiment.

FIG. 3 is a schematic view showing the positional relationship between the UV lamp modules and the baffles in second embodiment similar to the first embodiment. The arrangements of the UV lamp modules 3 and the light-shielding plate are the same as in FIGS. 1 and 2. That is to say, the fluid to be sterilized flows into the channel 2 from one end thereof, and the other end of the channel 2 is provided with a fluid level control device 9 for fluid outflow. The mounting bracket 4 of the UV lamp module group is fixed on the channel and provided with exactly the same number of mounting slots 5 as that of the UV lamp modules for the mounting of the latter. A closed light-shielding plate 8 is provided between adjacent mounting slots 5 of the mounting bracket 4 for shielding the UV light from leaking out of the channel 2. The orientation of the frame of each UV lamp module is perpendicular to the general flow direction in the channel. As shown in FIG. 3, the mounting bracket 4 and the light-shielding plate 8 of the UV lamp module group, which are the same as in FIG. 1, are omitted, and only two UV lamp modules are illustrated, one of which is shown in lifted state. A baffle 6 is respectively provided in front of each of the two UV lamp modules. What differs from FIGS. 1 and 2 is that the UV lamps 7 arranged in parallel on the frame are perpendicular to the fluid surface, while in the first embodiment the UV lamps 7 are parallel to the fluid surface. Since the UV lamps 7 are perpendicular to the fluid surface, it is not necessary to lift the modules away the channel as in FIGS. 1 and 2 when replacing the UV lamps, thus the workload for replacing the lamps is reduced and the risk of damaging the lamps when lifting the modules away and resembling them again can also be decreased.

Figure 4:
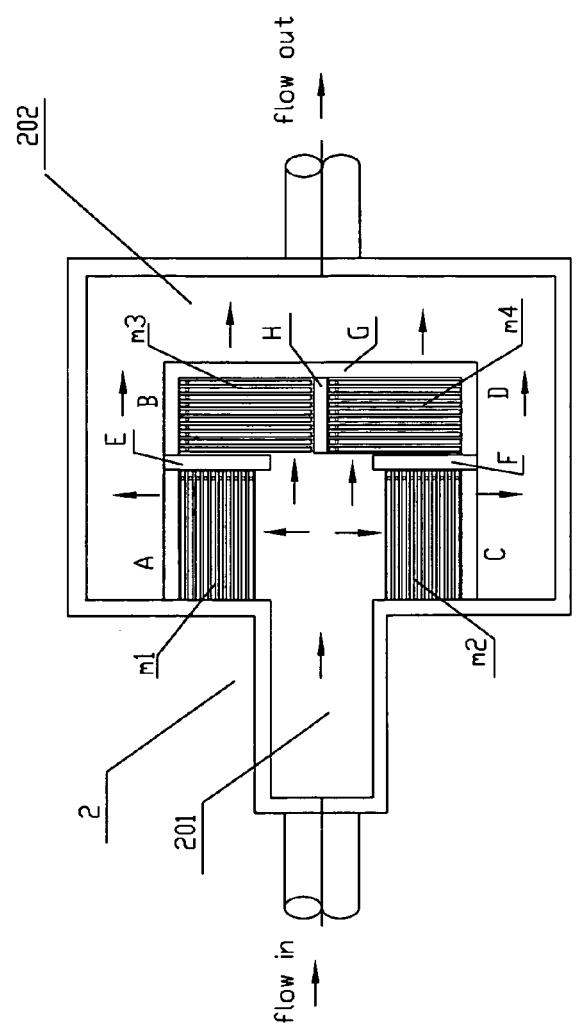
FIG. 4 is a schematic plan view of third embodiment according to the present invention.

In a third embodiment of the invention, as shown in FIG. 4, four UV lamp module groups m1, m2, m3, m4 are respectively parallel to or perpendicular to the general flow direction in the channel. In this embodiment the fluid level control device is used as an overflow weir at the outlet end of the channel, such that the sterilized fluid overflows out naturally. As shown in FIG. 4, the fluid inlet end and the fluid outlet end of the channel 2 are respectively designated by 201 and 202. The walls B and D are both higher than the fluid level in the channel to prevent the fluid from overflowing from the top of the walls B and D. The walls A, C and G are used as outflow weirs 9, and the walls E, F and H are used for mounting the mounting brackets for the UV lamp modules. The walls A, B, C, D, E, F, G and H are all in sealingly contact with the bottom of the channel.

The arrows in FIG. 4 represent the flow directions of the fluid. As described in the first embodiment, one baffle can be provided on the upstream or the downstream of each UV lamp module.

When the baffles of the UV lamp module groups m3 and m4 are provided on the upstream of the respective UV lamp module groups m3 and m4, the walls E, F and H can either be in sealingly contact with the bottom of the channel, or simply serve as mounting supports without sealingly contacting with the bottom of the channel.

According to the invention, in the case where the flow rate or the variation range of the flow rate is large, the space higher than the effective radiation distance of the UV lamp module group towards the fluid surface, between the fluid inlet end and outlet end of the channel, can be used as a buffer zone before the fluid flows out, thereby the channel need not to be lengthened in order to keep the fluid level within the effective radiation distance, while stilling preventing the high heat parts of the UV lamps from being exposed to the atmosphere, and the sterilized fluid will overflow out naturally. Therefore, the fluid level can be controlled automatically, the protection of the lamps is facilitated and their service life is lengthened.

In the three above-described embodiments, each baffle 6 is provided either on the bottom of the light-shielding plate 8 of the mounting bracket 4, or on the frame of each UV lamp module. The thickness of each baffle is equal to or less than the interval between two adjacent modules.

It is also possible to fix each baffle 6 on the channel 2, i.e. on the sidewalls or the bottom of the channel. It is desirable to locate the bottom of each baffle 6 within the effective radiation distance of the UV lamp modules towards the fluid surface.

In the first to third embodiments, the orientation of the frame and the baffle of each UV lamp module 3 is perpendicular to the general flow direction in the channel, but the frame can also be parallel to or forms an angle with the general flow direction in the channel in practical use, as long as the projected width of the baffle on the channel section perpendicular to the general flow direction on the upstream of the baffle is equal to the internal width of the channel at a place where the baffle is located. In such case, all the sterilized fluid will flow through the effective radiation area of the UV lamp modules, and the fluid level control device is used as an overflow weir at the outlet end or at the side(s) of the channel, such that the sterilized fluid overflows out naturally.

The orientation of the frame of each UV lamp module may form an angle with the general flow direction in the channel, in other words, the longitudinal axis of the UV lamps forms an acute angle with the general flow direction in the channel.

The fluid UV sterilization system according to the present invention can be used for the sterilization of domestic sewage, industrial sewage, recycled water, tap water and other kinds of water.

Various modifications and improvements can be envisaged by those skilled in the art, without departing from the spirit and gist of the invention.

What is claimed is:

1. A fluid UV sterilization system comprising an electrical controller, a channel, a UV lamp module group consisting of one or more UV lamp module(s), each UV lamp module comprising a frame and a plurality of UV lamps mounted on the frame; the channel being provided with a fluid level control device, characterized in that the orientation of the frame of each UV lamp module is perpendicular to or parallel to or forms an angle with the general flow direction in the channel; a baffle is provided on either the upstream or both the upstream and downstream of at least one of the UV lamp module(s), the top of the baffle is higher than the effective radiation distance of the UV lamp module group towards the fluid surface, and the bottom of the baffle extends to such an extent towards the bottom of the channel that it at least reaches within the effective radiation distance of the UV lamp module group towards the fluid surface, and the projected width of the baffle on the channel section perpendicular to the general flow direction on the upstream of the baffle is equal to the internal width of the channel at a place where the baffle is located.

2. The fluid UV sterilization system according to claim 1, characterized in that further including a mounting bracket for the UV lamp module(s), the mounting bracket being fixed on the channel, and the UV lamp module(s) being mounted on the mounting bracket.

3. The fluid UV sterilization system according to claim 2, characterized in that the baffle is mounted on the bottom of the mounting bracket.

4. The fluid UV sterilization system according to claim 1, characterized in that the baffle is mounted on the UV lamp module(s).

5. The fluid UV sterilization system according to claim 1, characterized in that the baffle is fixed on the channel.

6. The fluid UV sterilization system according to claim 1, characterized in that the thickness of the baffle is equal to or less than the interval between two adjacent UV lamp modules.

7. The fluid UV sterilization system according to claim 1, characterized in that the baffle is provided on the upstream of the UV lamp module group.

8. The fluid UV sterilization system according to claim 1, characterized in that one baffle is provided on the upstream of each UV lamp module.

9. The fluid UV sterilization system according to claim 1, characterized in that one baffle is provided on the downstream of each UV lamp module.

10. The fluid UV sterilization system according to claim 1, characterized in that one baffle is provided between two adjacent UV lamp modules.

11. The fluid UV sterilization system according to claim 1, characterized in that the baffle is a blind plate.

12. The fluid UV sterilization system according to claim 1, characterized in that the upper part of the baffle is blind while the lower part thereof has perforations, which perforations are located within the effective radiation distance of the UV lamp module group towards the fluid surface.

13. The fluid UV sterilization system according to claim 1, characterized in that the fluid level control device is an overflow weir or a flap valve or an electrical gate.

14. The fluid UV sterilization system according to claim 1, characterized in that the fluid level control device is provided at the outlet end of the channel.

15. The fluid UV sterilization system according to claim 1, characterized in that the UV lamps are low voltage or medium voltage UV lamps.

* * * * *